United States Patent [19]

La Barge et al.

[11] Patent Number: 4,836,705
[45] Date of Patent: Jun. 6, 1989

[54] HOLLOW INTEGRAL RIVET

[75] Inventors: Robert L. La Barge, Ben Avon Borough; Ronald J. Ewing, Allegheny Township, Armstrong County, both of Pa.

[73] Assignee: Aluminum Company of America, Pittsburgh, Pa.

[21] Appl. No.: 68,569

[22] Filed: Jun. 29, 1987

Related U.S. Application Data

[60] Division of Ser. No. 863,453, May 15, 1986, Pat. No. 4,688,316, which is a continuation-in-part of Ser. No. 684,694, Dec. 21, 1984, Pat. No. 4,611,381.

[51] Int. Cl.$^4$ .................... B25G 3/28; F16G 11/00
[52] U.S. Cl. .................... 403/282; 403/283
[58] Field of Search ............ 29/509, 522.1, 432, 29/512; 403/282, 283; 411/181

[56] References Cited

U.S. PATENT DOCUMENTS

| | | | |
|---|---|---|---|
| 2,186,381 | 1/1940 | Howe | 29/432 UX |
| 2,215,918 | 9/1940 | Fay | 29/512 UX |
| 3,082,850 | 3/1963 | Weening | 29/521 X |
| 3,339,270 | 9/1967 | Walton et al. | 403/282 X |
| 3,579,809 | 5/1971 | Wolf | 29/522.1 X |
| 3,771,216 | 11/1973 | Johnson | 29/522.1 X |
| 4,214,358 | 7/1980 | Clerc | 403/282 X |
| 4,557,651 | 12/1985 | Peterson | 411/181 |

Primary Examiner—Charlie T. Moon
Attorney, Agent, or Firm—Elroy Strickland

[57] ABSTRACT

An assembly of at least two components joined together by at least one mechanical connection formed in sheet-like portions of the components and in an area of faying contact between the components. The assembly includes an integral collar projecting from one of the components and an outer integral collar projecting from the other components circumscribing the first collar. The inner collar has a cylindrical inner surface portion and a wall of varying thickness. At least a portion of this wall increases in thickness toward the outboard end of the collar to lock the collars together.

8 Claims, 5 Drawing Sheets

HOLLOW INTEGRAL RIVET

This application is a division of application Ser. No. 863,453, filed May 15, 1986, now U.S. Pat. No. 4,688,316. which is a continuation-in-part of U.S. patent application Ser. No. 684,694, filed Dec. 21, 1984 now U.S. Pat. No. 4,611,381.

BACKGROUND OF THE INVENTION

The present invention is directed to a method and apparatus for securing together two or more pieces of material in a manner that does not involve welding, adhesives, or the use of a separate fastener yet does involve the creation of a mechanical joint that has properties comparable to those produced by welding and separate fasteners.

Spot welds in aluminum sheet, such as Aluminum Alloys 6009 and 6010, have only approximately 60% of the static tensile strength and approximately 40% of the fatigue tensile strength of spot welds in steel sheet employed in automobile bodies. (Static strength is the highest constant load a joint will carry. Fatigue strength is the cyclic load a joint will carry over a given number of cycles.) This presents a serious deterrent to the use of aluminum body sheet in automobiles, as the method's alternative to spot welding of aluminum sheet presents substantial performance and cost problems in comparison to the spot welding of steel. Clinched joints, for example, which are alternative mechanical, non-separate fastener joints, have adequate static tensile strength but inadequate stiffness and fatigue tensile strength. Properly made adhesive joints have satisfactory properties, but the cost and the speed of production are problems since adhesives require cleaning of the sheet, spreading of the adhesive, jigging, clamping sheet portions together and then curing of the adhesive. The cost of the adhesive material is also a factor in the economics of using adhesives. Rivets give satisfactory performance but again the cost and speed of production are problems, as the rivets require jigging, drilling or punching of holes in the sheets, placing the rivet in the sheets and heading the rivet. The cost of the rivet itself is also an economic factor. By comparison, the spot welding of steel requires only jigging and the welding process which involves a single-stroke operation. The spot welding of steel does not require any preparation for joining nor the placement of an expendable joining element, such as a rivet, nor the step of fixing the joining element in place. This makes the spot welding of steel substantially faster, more convenient and lower in cost than the available methods for joining aluminum.

BRIEF SUMMARY OF THE INVENTION

It is therefore an objective of the present invention to provide a mechanical joint between components of material suitable for structural joining in automobiles and other applications involving structural alloys and tempers by forming hollow, integral, open-ended collars in the material.

Another objective of the invention is to form the above joint in a period of time comparable to the time required to effect a spot weld in steel workpieces by employing methods and apparatus that provide savings of 20–30% over that of equipment for the spot welding of steel and which requires an energy consumption that is about 1% of that required to spot weld aluminum.

It is yet another objective of the invention to effect a joint using inner and outer hollow integral collars that are locked together against axial displacement without heading or flaring the collars.

Another objective of the invention is to provide tooling to make the subject joint in which the inner integral collar has a somewhat hourglass configuration in axial cross section, the configuration locking the inner and outer flanges together against axial displacement.

A further objective of the invention is to provide residual compressive stress between faying surfaces of the collars to produce tight, stiff joints.

A further objective of the invention is to provide high compressive stress between faying surfaces of the collars during forming to offset the effects of tensile hoop stresses that can cause stress risers and cracking in the as-formed collars.

These and other objectives of the invention can be provided by a portable, fluid powered gun having, inter alia, punch and die assemblies for forming the integral collars. Since the source of power is fluid (an inert gas and/or hydraulics), many such guns can use a single fluid source, as opposed to multiple electrical power supplies that are usually required for a plurality of spot welders. Handling of the gun of the invention, however, is similar to handling a spot welding gun, as both exert a clamping action on the workpieces to be joined. The clamping forces for the apparatus of the subject invention though are substantially greater than those employed for spot welding such that the gun employed in the subject process may be slightly heavier than that employed for spot welding. Spot welding requires only a force sufficient to create good electrical contact between two sheet components and between the components and the spot welder tips, while the subject invention requires sufficient forces to form the joint.

THE DRAWINGS

The objectives and the advantages of the invention will be best understood from consideration of the following detailed description and the accompanying drawings in which.

PREFERRED EMBODIMENT

Figure 2:
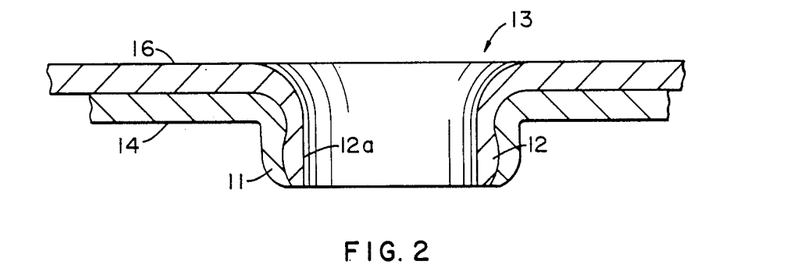
Figure 3:
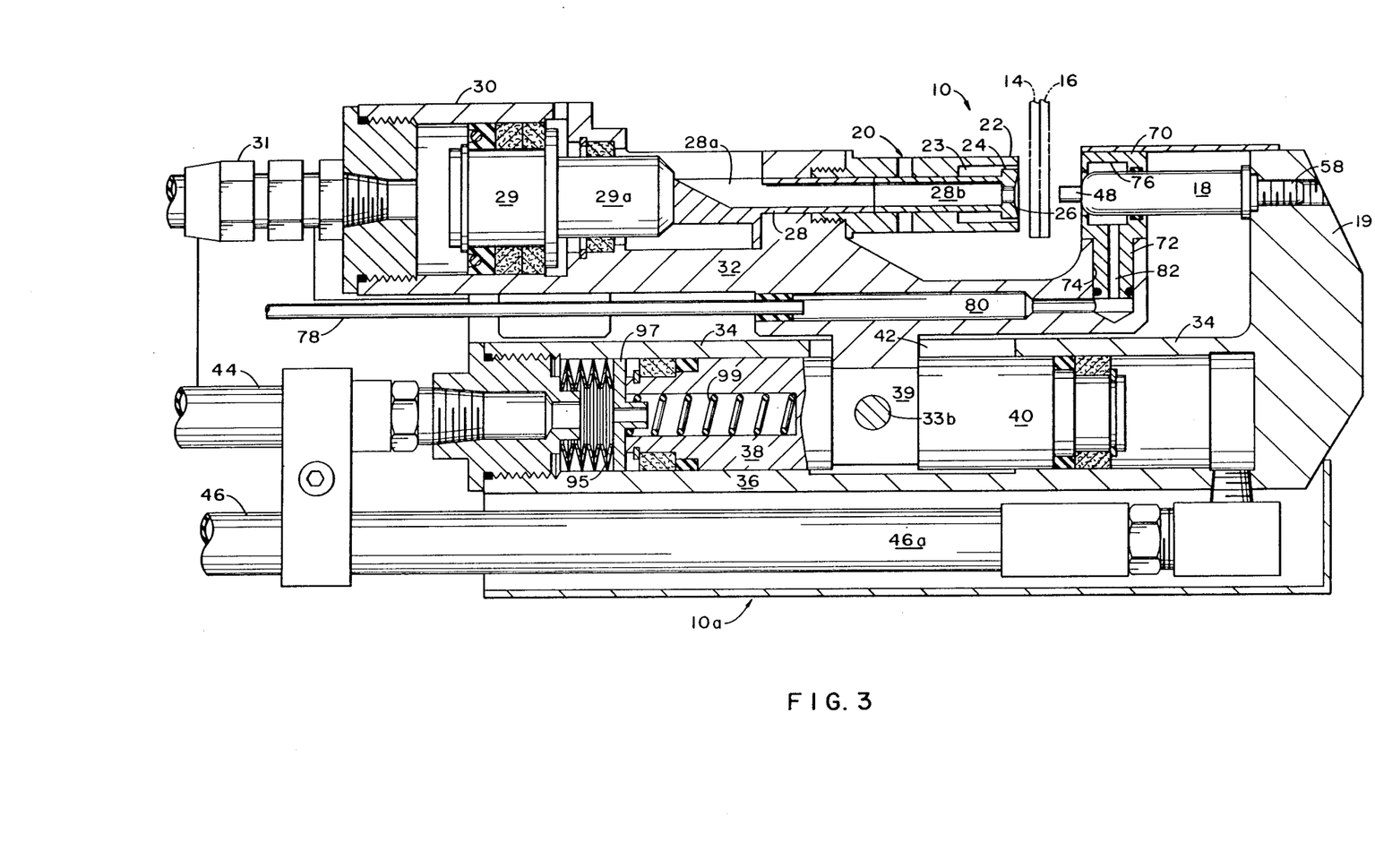
FIG. 3 shows a mandrel and die arrangement for effecting the rivets of FIGS. 1 and 2.

Referring now to FIG. 3 of the drawings, die assemblies 10 are shown for forming integral, axially locking collars or flanges 11 and 12 (FIGS. 1 and 2) from two (or more) components of sheet or sheet-like material 14 and 16 that are disposed together. The collars of FIGS.

Figure 1:
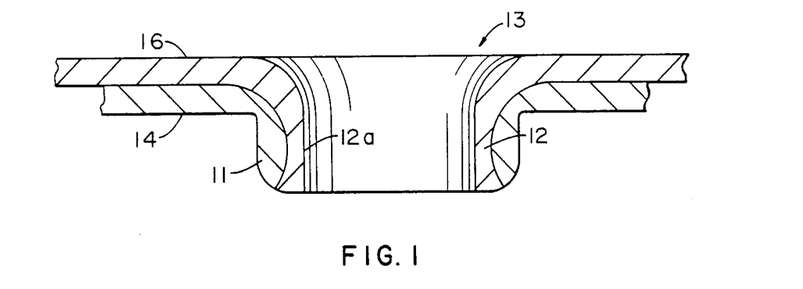
FIG. 1 and 2 are views in cross section of two hollow integral rivets of the invention.

1 and 2 provide a headless rivet, generally designated by numeral 13, that results in a high strength mechanical joint between components 14 and 16. FIG. 1 is typical of joints in sheets 0.040" and thinner wherein a starting hole is about ⅓ the internal diameter of the final hole of the collars. FIG. 2 is typical of joints in sheets of 0.080" and thicker wherein the starting hole is on the order of ⅔ of the internal diameter of the final hole.

The assemblies of 10 are preferably housed in a portable, hand-held device 10a that allows a workman to quickly and easily locate the device on opposed sides of 14 and 16 and rapidly join 14 and 16 together by forming the integral rivet of FIGS. 1 or 2. The invention, however, is not limited to a joining process employing only hand-held devices.

As shown further in FIG. 3, the assemblies of 10 include a mandrel 18 and a tool assembly 20, mandrel 18 being shown axially fixed in a frame member 19 of device 10a while the assembly 20 is axially movable in relation to 18. Obviously, 18 can be made movable and 20 fixed, or both can be made axially movable.

Assembly 20 comprises an outer, continuous wall and annular structure 22 providing a female die and a die opening 23 having an internal diameter larger than the outer diameter of 18 by 1.1 to 1.6 times the combined thickness of the components (14 and 16) to be joined.

Located in the axial center of assembly 20 is a pressure pad 24, the surface 26 thereof facing mandrel 18 being flat or concave. The center of pad 24 is shown open to provide a cutting edge 27 of a perforating die (in cooperation with a perforating punch 48 described hereinafter).

The pressure pad 24, still referring to FIG. 3, is mounted at one end of stem structure 28 that is mechanically associated with a piston 29 located in a cylinder 30. Between a forward extension 29a of the piston and the rearward end of stem 28 is a discharge chamber 28a and slanted opening therein. This structure is an integral part of stem 28 such that a hollow bore 28b of the stem opens into the hollow of the discharge chamber. Such a structure and opening provide an outlet for the discharge of metal blanks that are produced in forming the rivet of the invention.

Cylinder 30 can be supplied and regulated with an inert gas, such as nitrogen, at 31 under a pressure value sufficient to have piston 29 hold pad 24 against the forming force of mandrel 18 in a manner explained hereinafter. In FIG. 3, cylinder 30 is pressurized such that the piston is in a position disposed against structure 28.

Figure 5:
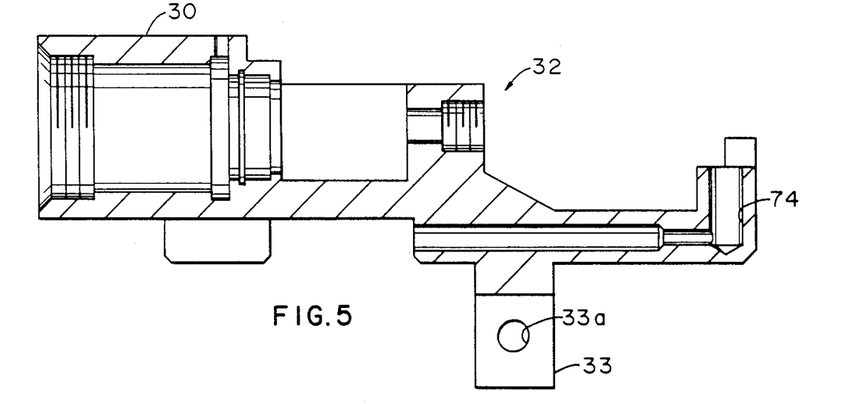
FIG. 5 is a view of a slide mechanism of the arrangement depicted in FIG. 3.

Continuing with FIG. 3, and referring also to FIG. 5, a slide mechanism 32 is shown for translating the die assembly 20 toward and away from mandrel 18. More particularly, slide 32 is made to engage and support the die pad arrangement (20, 24 and 28), and is provided with an integral structure and saddle 33, located opposite the die and pad. The saddle extends through the wall 34 of a cylinder structure 36 housing two pistons 38 and 40. An elongated slot 42 is provided in wall 34 to accommodate axial translation of saddle 33, the length of the slot being the length required for moving die 20 to mandrel 18 in the process of making integral rivet 13. The saddle structure straddles an integral wall 39 (visible only in FIG. 3) that connects pistons 38 and 40 together. A pin 33b extends through an opening 33a provided in the saddle and through a corresponding opening provided in 39. An appropriate fluid is directed to cylinder 36 and behind pistons 38 and 40 via hoses 44 and 46 respectively. An extension 46a of hose 46 is employed to direct the fluid to the area of the cylinder behind piston 40.

It might be noted here also that slide member 32 is a one-piece structure that accommodates a system, described in detail hereinafter, for automatically supplying a lubricant to mandrel 18.

Figure 4:
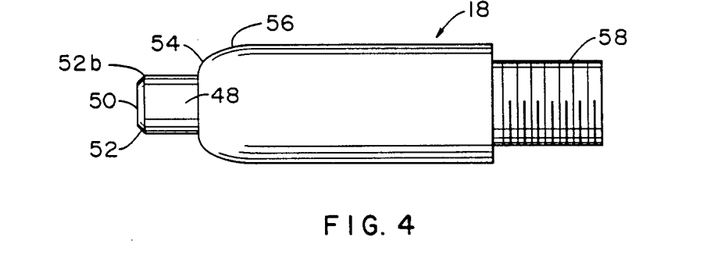
FIG. 4 is an enlarged side elevation view of the mandrel of FIG. 3.

Referring now to FIG. 4 of the drawings, mandrel 18 of FIG. 3 is enlarged to better show the profile of the mandrel. As depicted, the forward end of the mandrel is provided with a cylindrical perforating punch 48. The size (diameter) of perforating punch 48 is about one-third (⅓) to two-thirds (⅔) of the diameter of the main body of mandrel 18.

Figure 4A:
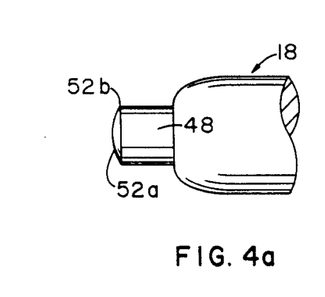
FIG. 4a, b and c are side elevation views of a punch located on the forward end of the mandrel of FIG. 4.
Figure 4B:
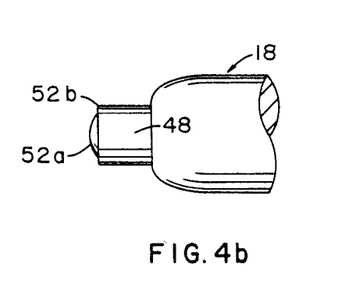
Figure 4C:
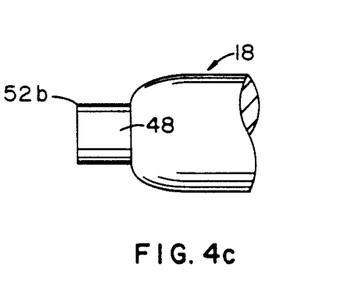

The forward end or face of the perforating punch can be flat (FIG. 4c) or have a flat central portion 50 (FIG. 4) that projects forward of a cutting edge of the punch so as to form a dimple in the components before the cutting edge makes contact with the surface of the adjacent component. Portion 50 may be provided in a variety of ways, such as by the beveled edge 52 shown in FIG. 4, or, by the rounded configurations 52a as shown in the partial views of 48 in FIGS. 4a and b. Hence, in FIG. 4, 50 is non-cutting while the outermost position of bevel 52, which is labeled 52b, is sharp and is the cutting portion of punch 48. Whatever the profile of the forward surface 50 of punch 48, the edge formed by the intersection of the forward surface and cylindrical side of 48 should be sharp so that the edge cuts or at least produces a sharp notch in the surface of the material when it contacts the material.

In tests of the punch and die assembly, as thus far described, an angle of 45° for the bevel of 52 was found to be satisfactory. The width of the bevel was about 15% of the diameter of 48, leaving a flat forward surface of 70% of the diameter of the perforating punch of FIG. 4.

Still referring to FIG. 4, the face or forward portion of the main body of mandrel 18 (which is cylindrical) is provided with radii of curvatures 54 that decrease as the radii approach tangency with the face of the punch, which is the portion of the punch adjacent perforating punch 48. The radii of curvature of the face of 18, however, in approaching the outer diameter and cylindrical surface of 18 increases, as indicated by numeral 56. Hence, the optimum curvature of the forward end of the mandrel is not that of a simple radius of a perfect circle. A simple radius would produce an inferior joint. These radii of the forward end of the mandrel change with changes in the diameter of its main body, as well as with the thicknesses of the workpieces to be joined together. Larger diameters, which are used with thicker materials, require larger radii.

The radius of curvature of the concave surface 26 (FIG. 3) of the pressure pad is five to ten times that of the forward radii of the mandrel.

The other end of mandrel 18 is shown provided with a threaded nipple 58 that is an integral structure of its main body. Nipple 58 provides a means to mount the mandrel to and remove the same from supporting frame 19 (in FIG. 3).

The operation of the apparatus of FIGS. 3 and 4 is as follows. Two or more workpieces or components 14 and 16 having sheet-like portions of material to be joined together are placed in a space between the mandrel and the female die. The material of the pieces should be malleable, which includes most metals, though the invention is not limited thereto, as there are nonmetallic materials that are malleable, such as certain plastics.

In addition, it has been found that deoxidizing the surface of aluminum alloys before forming the integral collars 11 and 12 of the invention produces the benefit of resisting the creepage of oil into the faying surfaces after the collars have been formed. Any oil interring between the mating surfaces of the collars reduces somewhat the holding properties of the collars. The properties of rivet 13 drop as soon as oil gets between faying surfaces. If the joint of 13 is formed of non-deoxidized aluminum using an optimum amount of forming oil (the minimum required for lubrication to maintain cleanliness of components), the very small amount of residual oil left on the collars of the rivet takes three to four weeks to creep into the entire length of faying surfaces. The drop in properties is proportional to the percent of faying surfaces contaminated with oil. However, liberal amounts of a penetrating type of oil will creep the full depth in a few hours and produce the same reduction in properties that takes three to four weeks with small amounts of forming oil. This phenomenon is the result of the residual oil lubricating and therefore substantially decreasing the coefficient of friction between the faying surfaces. The coefficient of friction of clean dry aluminum against clean dry aluminum can be greater than one, whereas the coefficient of friction for lubricated aluminum surfaces is substantially less than 1. It is difficult to measure the coefficient of friction between the faying surfaces of the collars of the rivet but it is suspected that it is much higher than one because of the microscopic intergranular engagement of the pristine aluminum surfaces. Further evidence that it is the reduction in coefficient of friction that causes the drop in properties is the fact that the collars with oil in the faying surfaces will regain full as-formed properties if exposed to 30 days of intermittent salt spray. After such exposure, the faying surfaces are covered with a very fine corrosion product, which apparently reestablishes the microscopic intergranular engagements. It is further suspected that the reason that deoxidization prevents oil from creeping into the faying surface is that the area thereof is increased about 40% in forming the rivet of the invention. The absence of or minimum amount of oxide present between the surfaces permits the oxidation of the newly exposed aluminum to seal the joint aganist entry of oil, as the oxide occupies more space than the original aluminum molecules and therefore acts as a cork to seal the joint.

By deoxidizing the faying surfaces, the present invention insures lasting mechanical properties for the collars in the presence of oily and greasy environments. Deoxidizing can be accomplished by dipping the surfaces in a chemical solution that dissolves the aluminum oxides with minimum attack on the aluminum substrate.

Through the operation of suitable control circuitry and switches, discussed in some detail below in reference to FIGS. 11 through 14 of the drawings, an appropriate fluid is directed to the area of cylinder 36 behind piston 38 through hose 44. Under pressure of the fluid, piston 38 moves saddle 33 and thus slide 32 to the right to direct the die assembly 20, including pressure pad 24, against metal piece 14, (FIG. 3) and moves the pieces 14 and 16 to and against the non-cutting face 50 of perforating punch 48. The pressure pad is maintained firm against piece 14 by the pressure of a supply of inert gas directed to cylinder 30. Gas pressure is employed here, as opposed to a mechanical spring, because the pressure of a gas is more readily adjustable than that of a mechanical spring. An adjustable valve, for example, can be connected in a hose supplying the gas and thus be located remotely from the tool and assembly of the invention. This is important in a hand-held device, as the remotely located valve does not add to the weight of the device. In contrast thereto, adjustment of a mechanical spring requires a threaded member in the housing of the spring, which member adds to the weight and bulk of the device.

The configuration of the non-cutting face of punch 48, the concavity of pressure pad 24, the opening 27 in the pad and the pressure in cylinder 30 delay piercing of the components 14 and 16 as long as possible to produce as deep a dimple as is possible yet still blank out a slug rather than simply splitting the components. The advantages of making the dimple as deep as possible will be explained later. A blanked out starting hole is required to form the rivet of the invention without producing longitudinal cracks in the completed rivet. When the pieces are moved against punch 48, and the materials of the components are moved into concave area 26 of pad 24, mating dimples (FIG. 6) of material are initially formed in pieces 14 and 16, and the materials are under considerable tension when punch 48 cuts through the materials adjacent the cutting edge of opening 27, see again FIG. 6. Such action takes maximum advantage of the dimpling action of the perforating punch to start the formation of collars 11 and 12 about a "starting" hole 60 (FIG. 6) yet still provides a good blanking or shearing operation, i.e., it ensures reasonably clean cut starting holes 60 in components 14 and 16.

Figure 6:
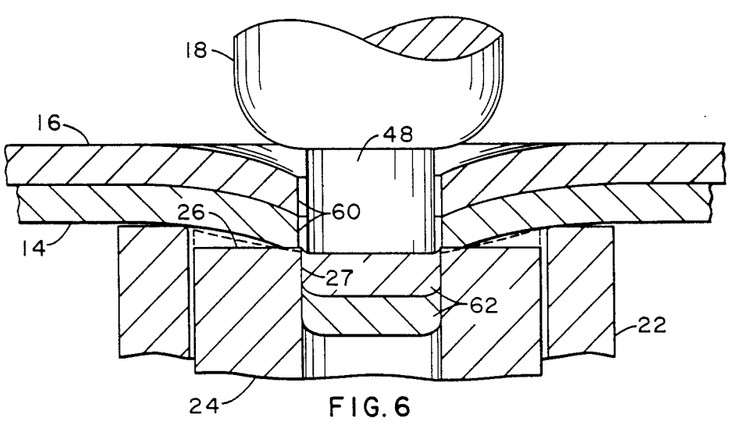
FIGS. 6 through 10 show positions of the tooling of the invention in forming the rivets of FIGS. 1 or 2 from workpieces to be joined together by the rivets.
Figure 7:
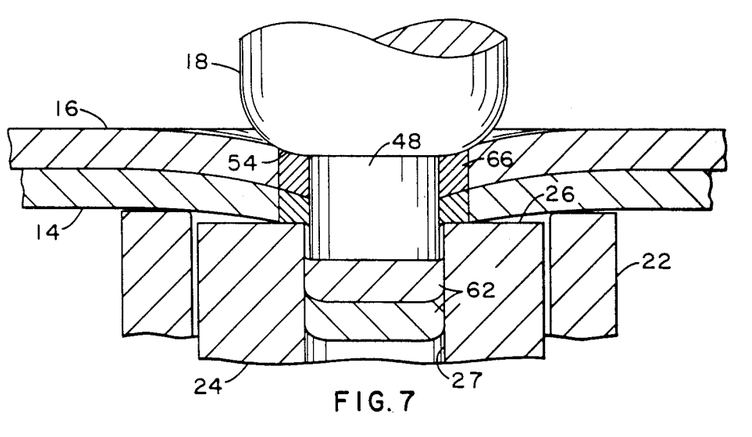

After punch 48 cuts through component pieces 14 and 16, as shown in FIG. 6, punch 48 enters opening 27 in pressure pad 24, as shown in FIG. 7, such that the rounded face 54 of mandrel 18 forces the material of lower component 14 into and against the surface 26 of pressure pad 24. Slugs 62 of the material of 14 and 16 are cut from the components in die opening 27 and will travel through bore 28b in stem 28 (FIG. 3) to be discharged from tool 10 through an inclined discharge chamber 28a.

Before completion of blanking, the force of perforating punch 48 places considerable tension in component sheets 14 and 16 such that a crater is formed in the sheets and holes 60 stretch to a size somewhat larger than the diameter of the punch. these are shown in FIG. 6 of the drawings. The tension stresses in the sheets are high because the force of the pressure pad 24 cannot be set high enough to resist the total force of the punch 48 necessary to punch holes 60. This is because only a small area 64 (FIG. 9) of the lower corner of the lower sheet 14 contacts the pressure pad in a latter stage of forming the collars. Too high a force would cause excessive extrusion of the open ends of the collars in the collar forming process. To avoid this problem, the female die 22 supplies a portion of the force required for resisting the punching force of 48. Varying the gas pressure to produce a high force on the pressure pad during perforating and a lower force in a later stage of forming is an alternate solution, but not preferred, because it would add to the complexity and cost of the tool and eliminate the high tension forces in the sheet.

The tension forces produced in the sheet-like portions promote fracture of the sheet-like materials wherever punch or pressure pad notch the sheets. This allows a large radial clearance between the punch and pad opening which can accommodate misalignment and deflection of the tools. This is a significant advantage because the large forces (2000 to 5000 lbs) required to form the integral rivet of the invention tend to promote deflections in lightweight tools.

FIG. 7 of the drawings shows mandrel 18 of the subject tooling applying just enough force to overcome the force of pressure pad 24 and thereby start downward movement of the pad. This requires engagement of the face of the mandrel with the upper surface of upper sheet-like portion 16. A compressive force is now created between the mandrel face and pressure pad in an annular critical area 66 of the sheets surrounding holes 60. The first effect of this force is to "coin" a concave annular ring on the upper surface of 16 and a corresponding annular area on the underside of lower sheet-like portion 14. This coining occurs because the initial areas of contact are too small to resist the compressive force without exceeding the yield strength of the material of the pieces. These coinings extrude the materials of 14 and 16 inwardly such that the diameters of holes 60 shrink to the diameter of punch 48.

Figure 8:
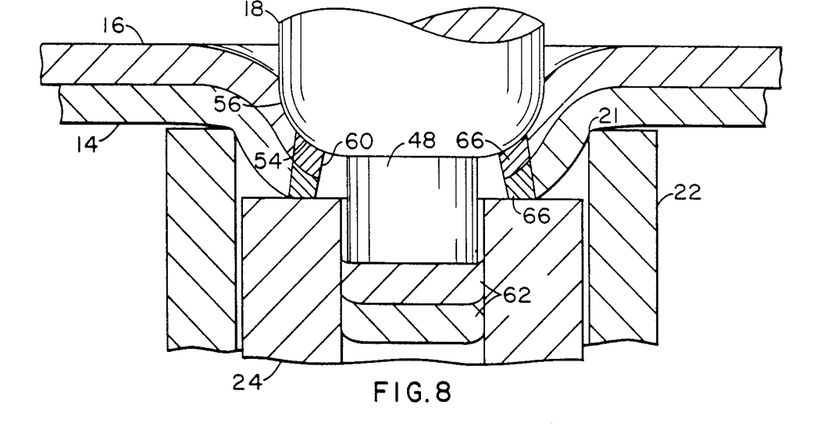

FIG. 8 of the drawings shows the integral rivet of the invention in a state of about halfway to completion. The pressure pad 24 is shown in a lower position than that of FIG. 7, but the gas pressure on 24 provided via piston 29 in cylinder 30 maintains the compressive stresses in the annular critical area 66 of the sheets surrounding holes 60. The compressive stresses are maintained at the yield strength of the materials of the sheets in the critical area of 66. The compressive stresses are automatically maintained at the yield strength of the material because the force on the pressure pad is set high enough to exceed the yield strength in the areas of initial contact with the pad and mandrel. This causes coining which increases the area of contact until stress is reduced to yield strength. Since material progression of collar forming tends to constantly decrease the area of contact, stress tends to increase over yield strength. This causes more coining which increases the area and reduces stress to yield strength. Compressive stress is therefore maintained at the yield strength which is the ideal condition.

Such high compressive stressing permits extraordinary stretching of the sheets in the critical area, i.e., on the order of 200 to 300 percent which is far beyond the test bar elongations for the particularly alloy or alloys of components 14 and 16. In addition, because the high compressive stresses in the critical area prevent initiation of cracks at the open ends of the collars, areas of the sheets outside of the area subjected to the compressive force can also be stretched much beyond their test bar elongations; i.e., on the order of 25-100%. Such cracks are particularly a problem with punching, as punching tends to produce ragged edges which act as stress risers to promote initiation of cracks. High compressive stresses, however, allow punching and, in the embodiment of the invention presented in the drawings, using an integral punch 48 on the forward end of mandrel 18, permits formation of the hollow integral rivet in one continuous operation or stroke of the process. The integral rivet of the invention is formed from material of the sheet-like portions in the plan area of female die 22. A very small radius (no larger than 0.010 inch) at 21 on the internal diameter of die 22 prevents drawing of material from surrounding areas of the sheet-like portions. Further, for reasons discussed below, a small radius at 21 produces the strongest possible joint via the integral collars of the invention.

The progression of the process depicted in FIG. 8 also shows the holes 60 in the sheets stretched open by the curved face 54 of mandrel 18, as the face forms the material of 14 and 16 in female die 22. A variation in the thickness of the inner collar occurs here because of the varying radii 54 and 56 of the mandrel face (described earlier in reference to FIG. 4 of the drawings). The smaller radius 54 is made, the greater the tendency for the mandrel to plow metal ahead of it and the greater the amount of hourglass that is formed. The larger radius 54 is made, the greater the tendency for the mandrel to just expand the hole without plowing metal ahead of it and the lesser the amount of hourglass that is formed. However, making radius 54 too small creates excessive tensile stresses in the inner collar parallel to the centerline of the collars, which stresses cause the inner collar to be pulled apart at the location of the minimum wall thickness of the hourglass. Therefore, optimum tool design uses the smallest radius at 54 that will not fracture the inner collar.

Figure 9:
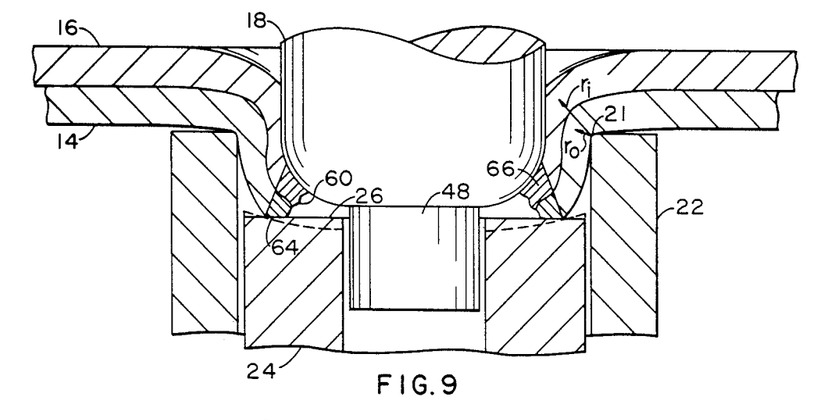

Compressive stresses equal to the yield strength are maintained on the sheet portions between mandrel 18 and face 26 of pressure pad 24 by the pressure in cylinder 30 as the pressure of the fluid behind piston 38 moves female die 22 over mandrel 18. As seen in FIG. 9 the force of the mandrel is greater than the force provided by cylinder 30 such that downward translation of the pressure pad in the female die continues. The high compressive forces on the portions of the sheets between the mandrel and female die creates a high frictional force between faying surfaces of the sheets that prevents relative sliding of sheets. Sliding is prevented because compressive forces at the yield strength of the sheet material, produce microscopically complementary granular mechanical engagement between the faying surfaces.

Such a high coefficient of friction between faying surfaces can be further increased by thorough cleaning of the mutually contacting surfaces of the sheets before they are placed together. In the case of metal pieces, solvent vapor degreasing or washing of the pieces in a non-solvent cleaner have been found highly effective in obtaining satisfactorily clean surfaces. Clean, dry surfaces of most metals provide typically high coefficients of friction.

Due to the absence of such relative sliding and with the fact that the inner sheet 16 is moved over a larger average radius ($r_i$) about the inner radius 21 of die 22 than the average radius of the outer sheet 14 ($r_o$), the inner sheet is stretched thin, as shown in FIG. 9, in comparison to the portion of the inner sheet that is being plowed ahead of the mandrel. The integral collars in FIG. 9 are now about 80% complete, with the forward end of mandrel 18 still being out of contact with face 26 of the pressure pad.

In FIGS. 6 to 9, face 26 of the pressure pad is depicted as being both flat (solid line) and concave (dash outline). The concave face maintains compressive contact longer than the flat face, and is therefore preferable in forming the curved hourglass shape of the faying surfaces for effecting a maximum strength joint. Such concavity, however, cannot be excessive because of the limited amount of crater deformation occurring before holes 60 are completely punched (FIG. 6). If the concavity of the pressure pad is too great, the surface of the pressure pad at its outer diameter will be so high that the material of the pieces can not be cratered sufficiently for the underside piece 14 to made contact with the cutting edge of the perforating die, which is in the center of the pressure pad. If the underside piece does not make contact with the cutting edge of the perforating die, the hole produced will have very ragged edges, or, in the worst case, no slug will be blanked out; rather, the material will simply split.

Piston 38 continues to translate female die 22 over mandrel 18. When the face of the mandrel engages the face of pressure pad 24 (FIG. 10) the pressure pad moves out of contact with integral collars 11 and 12 while the point of tangency of the convex face and cylindrical side of the mandrel moves past the ends of the collars. The larger radius at 56 expands the open ends of the collars with minumum reduction of the thickness of the inner collar at its open end, thereby retaining the hourglass shape. This completes collar formation and insures a maximum hourglass shape for the faying of the collars, as the cylindrical shape of the main body of the mandrel provides the inside surface 12a of inner collar 12 with a cylindrical surface. Since the inner collar stretches more than the outer collar, the ends thereof at the completion of the collars lie in approximately the same plane.

Figure 10:
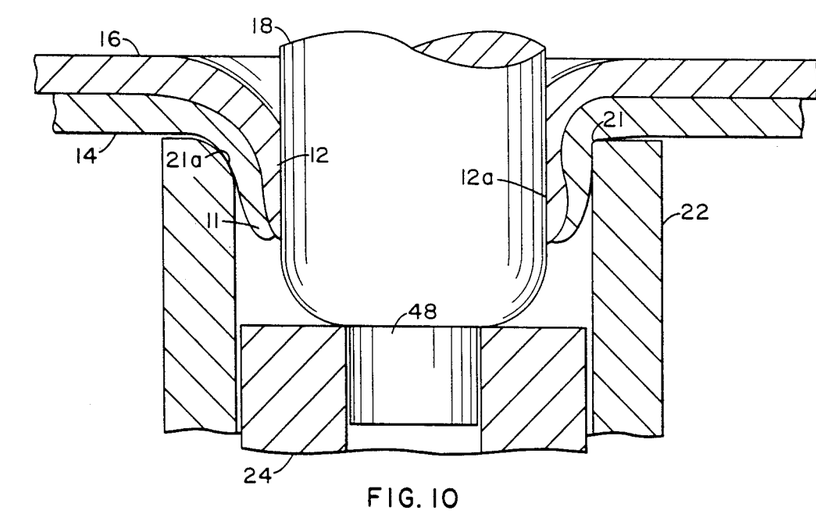

In forming the collars and the integral rivet 13 of the invention the areas of the faying surfaces are increased approximately 40%. This increase is effected by the compressive stresses, the plowing of material ahead of the mandrel, and the complementary granular surfaces discussed above, as the materials of sheets 14 and 16 are stretched, extruded, and formed about the small radius 21 of female die 22. The left side of the female die in FIG. 10 is shown with a die radius 21a that is relatively large. With such a radius, little or no differential thinning of the inner collar takes place. This results in practically no hourglass configuration being effected between the faying surfaces, and hence an ineffective joint is produced.

The hourglass shape is allowed to form in die 22 in the processes of the invention because there is little or no ironing of the walls of the collars, though the space between the die surface of 22 and the surface of mandrel 18 is less than the combined original thickness of pieces 14 and 16. As indicated earlier, the die opening in 22 is essentially cylindrical, such that, as punch 18, which curves away from the interior surface of the die, moves the material of 14 and 16 into the die opening, contact between the material of outer collar 11 and the interior surface of the die is limited to the base of the outer collar and to about 10% of the final height of the collar. For the remainder of the extent of the collar, the material thereof is drawn essentially in air. In this manner, ironing of the walls of the collars in the die is avoided.

Ironing is to be avoided because it reduces the amount of the hourglass shape effected, and produces compressive stresses in the final structures of the collars, both of which reduce the strength of the final joint 13. Compressive stresses, for example, nullify an existing tensile springback (a shrinking in diameter) of the outer collar circumferentially on the inner collar. When joining sheets of metal, for example, of identical thickness, yield strength and modulus of elasticity, any orientation of the sheets relative to the punch and die produces the same high strength hourglass joint, with the outer collar exhibiting a circumferentially elastic springback or shrinkage phenomenon that grips the inner collar when mandrel 18 is withdrawn. The reason for this lies in the face that the outer collar has a larger mean diameter than the inner collar, and the shrinkage phenomenon varies per unit of material length. Hence, the outer collar shrinks more than the inner collar and an interface pressure exists between the collars of completed rivet 13. This interface pressure insures the maintenance of the microscopically complementary, mechanical, granular engagement between the faying surfaces of 11 and 12 which is produced by stretching and extruding them while pressing them against each other with a high level of stress created first by the force of the pressure pad and then by the force attendant with expanding the outer collar by expanding the inner collar within the outer collar.

When joining pieces that are identical except for thickness, however, the strongest joint is made if the thicker piece is in the inner collar, as the inner collar always experiences more thinning than the outer collar.

When joining items having unequal yield strengths and/or moduli of elasticity, the item with the least elastic springback should form the inner collar, again, to the effect that larger springback of the outer collar moves into tight engagement with the inner collar when the punch is withdrawn from the collars.

Elastic springback varies directly with the yield strength of the material involved in making the integral rivet of the present invention, and inversely with the modulus of elasticity of the material. Because of this, the piece of material having the lowest ratio of yield strength to modulus of elasticity should form the inner collar regardless of the relative thicknesses of the pieces. Before mandrel 18 is withdrawn from the collars, all materials in the collars are stressed to their yield strengths. Withdrawal of the mandrel allows the collars to shrink in diameter elastically in proportion to their yield strength and diameter and inversely as their modulus of elasticity. If the material having the lowest ratio of yield strength to modulus of elasticity is located on the outside of the rivet, shrinkage of the inner collar will be greater than that of the outer collar, which will form a looser, weaker joint. Locating the material having the lowest ratio of yield strength to modulus of elasticity on the inside of the rivet insures that the shrinkage of the outer collar will always be greater and therefore insure a tight joint.

In forming the integral rivet of the invention, mandrel 18 requires lubrication. To this end and for the purpose of stripping the rivet from the mandrel after it is formed, a combination stripping and lubricating means 70 is provided as shown in FIG. 3. More particularly, 70 is a cup-shaped housing structure (as shown) that is a tool item separate from but appropriately secured in the end of the one-piece slide 32 that is located adjacent mandrel 18. 70 is secured in 32 by an extension 72 seated ina corresponding recess 74 provided in 32.

Housing 70 is located around the mandrel and is provided with an opening 76 through which the mandrel travels in forming the rivet of the invention. The inside of the cup of the housing is packed with a soft material (not shown) capable of absorbing and retaining a lubricant. The material is in contact with the forward rounded surfaces of the mandrel such that the mandrel is always lubricated for and during the rivet-forming process, the lubrication also preventing the accumulation of metal material on the mandrel surface.

Lubricant is supplied to housing 70 preferably from a supply and automatic dispenser thereof (not shown) connected to housing 70 via an oil feed tube 78 suitably fitted and sealed in slide member 32 and connected in fluid communication with a channel 80 provided in 32.

Channel 80, as shown in FIG. 3, is connected to an opening 82 extending through the center of the extension 72 of housing 70.

Figure 11:
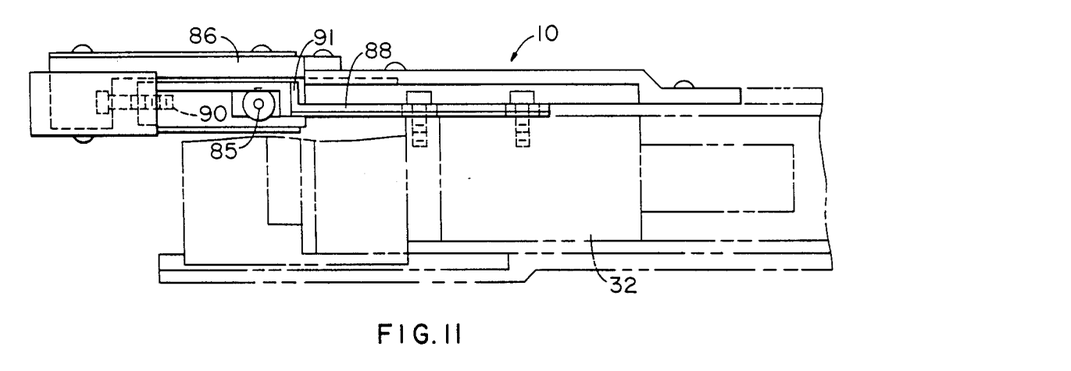
FIGS. 11 and 12 show respectively side elevation and plan views of an automatic switch mounting for the invention.
Figure 12:
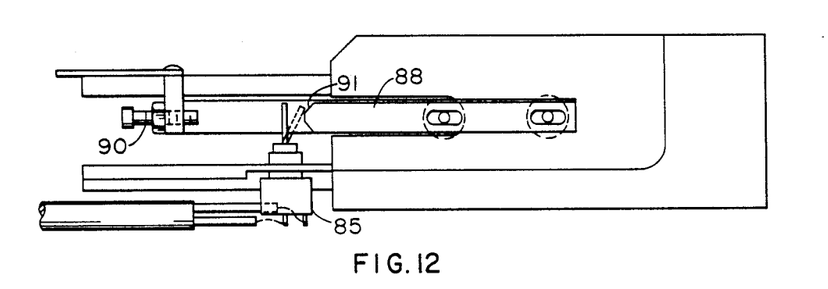

FIGS. 11 and 12 of the drawings show a toggle switch 85 fixedly mounted on the side of the main body of tooling arrangement 10 of the invention by a bracket 86 (FIG. 11). A second bracket 88 is suitably secured to and mounted on slide member 32. The left hand end of bracket 88 has mounted therein a set screw 90. the set screw is located opposite a shoulder 91 of the bracket, with 90 and 91 being disposed on opposite sides of the toggle of switch 85.

Figure 13:
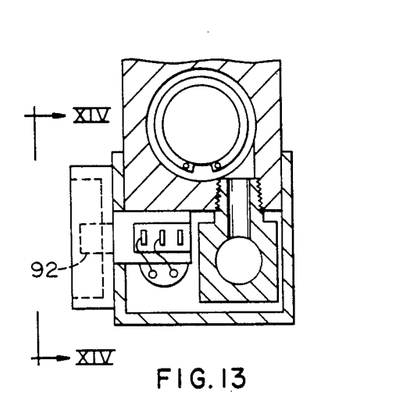
FIGS. 13 and 14 show respectively end and plan views of the control switches employable in operating the apparatus of the invention.
Figure 14:
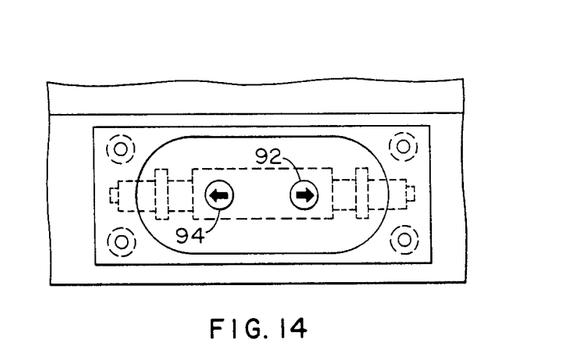

FIGS. 13 and 14 of the drawings show push-button switches 92 and 94 suitably mounted on the side of the tooling of the invention for effecting operation thereof in the following manner. Switch 92 is a "make" switch; when its button is pushed by a workman the switch completes an electrical circuit to a solenoid (not shown) that opens a valve (not shown) connected to supply conduit 44 with a pressurized fluid. This pressurizes the area in cylinder 34 behind piston 38 and thereby translates the slide member to the right in FIG. 3. Bracket 88 moves to the right such that set screw 90 engages the toggle arm of switch 85 (FIG. 11) and moves it to the right. This position of switch 85 is "on," which now energizes a second solenoid (not shown) that normally would direct fluid to hose 46 and hose extension 46a such that the area of cylinder 34 behind piston 40 would be pressurized. This normally would move the slide to the left; however, the slide will not move to the left until switch 92 is released, because the first solenoid is still energized; and since the fully shifted position of the first solenoid gives it more power than the unshifted position of the second solenoid, the valve supplying hose 44 will stay in position. Having both solenoids energized at the same time is not a problem because they are designed to operate under continuous power with no movement.

When piston 38 moves slide 32 forward (rightwardly in FIG. 3) stripper 70 also moves forward. Such action pushes the stripper, with its lubrication, further and further onto mandrel 18 until the stripper stops just short of making contact with the interior face of frame portion 19 (in which the mandrel is mounted). The travel of the slide in either direction is limited by the size of opening 42 in the cylinder wall in which the saddle moves.

When switch 92 is released the second solenoid, which is still energized by toggle switch 85, causes the valve to shift and pressurize the area of the cylinder behind piston 40. Piston 40 now moves to the left so that slide 32 moves left. This moves assembly 20 away from the mandrel and moves stripper 70 to the left to free sheets portions 14 and 16, which are now riveted together by 13, from the mandrel. As slide 32 moves to the left the stripper also moves to the left along the punch. In this manner, rivet 13 is easily removed from the mandrel and the lubricant in the housing of 70 again lubricates the surfaces of the mandrel as 70 moves to the left.

Toggle switch 85 remains closed (on) until the shoulder 91 of bracket 88 engages and moves the toggle of 85 to the left and thus to the off position. In the off position, the solenoids are de-energized and pressure is removed from both cylinder areas behind pistons 38 and 40.

In stripping the rivet from mandrel 18 Belleville springs 95, located between piston 38 and the left end wall of the cylinder, compress to allow stripper 70 to travel past an at-rest position such that lubrication of the forward end of mandrel 18 is effected at the leftmost end of the stroke. The cylinder area behind piston 40 is unpressurized such that the washers then expand to return the slide member and stripper to the at-rest position. This action wipes the oil absorbent material in the cup of 70 over radii 54 and 56 of mandrel 18, thereby wiping oil out of the absorbent material which then flows over the radii toward punch 48.

A spring 99 and a fitting 97 maintain a constant light force on the Belleville springs so that they cannot fall over when piston 38 is in its rightmost position.

An oiler (not shown) can also be energized by the circuit that energizes the second solenoid. When the second solenoid is energizes, the oiler is also energized and pumps a measured amount of oil to and through tube 78 and thus to the oiling felt in 70, and then resets itself for the next stroke. The measured amount of oil can be adjusted as required for the parameters of the rivet 13 presently being formed.

Bracket 88 can be adjusted by means of slotted holes to set the position at which surface 91 turns off 85, and set screw 90 can be adjusted to set the position at which it turns on the switch. A switch (not shown), located in a remote position from the tool and which is wired in electrical series with switch 85, can be turned off to incapacitate 85. In such a case the tool is operated in a manual mode. In the manual mode, the make-switch 92 moves the slide to the right, and a "strip" switch 94 (FIG. 14) moves slide member 32 to the left.

The make-switch 92 and the strip-switch 94 are electrically connected to always be enabled, even in the automatic mode. Releasing the make-switch 92 and closing the strip-switch 94 at any lateral position of the slide member will energize the second solenoid, whether 85 is open or closed, as the strip-switch is in an electrical circuit that is completely separate from that of the circuit of 85. If switch 85 is already closed, the closed switch 94 simply becomes a second circuit providing energizing voltage to the solenoid supplying hose 46. There is also no conflict with the switch 92. Even if the buttons of 92 and 94 are both held down at the same time, the respective valves will simply respond to the first one of the switches closed, as that solenoid will be in the fully shifted position and therefore have more power.

While the invention has been described in terms of preferred embodiments, the claims appended hereto are intended to encompass all embodiments which fall within the spirit of the invention.

What is claimed is:

1. An assembly of at least two components joined together by at least one mechanical connection in sheet-like portions of the components and in an area of faying contact between the components comprising an inner integral collar projecting from one of the components and an outer integral collar projecting from the other component circumscribing and intimately engaging said first collar, with the inner collar having a cylindrical inner surface portion and a wall of varying thickness, at least a portion of the inner collar is of increasing thickness toward the outboard open end of the collar to lock said intimately engaged portions of the collars together.

2. The assembly of claim 1 in which the collars mechanically engage each other with microscopically complementary granular surfaces.

3. The assembly of claim 1 in which open, outboard ends of said collars are substantially coplanar.

4. The assembly of claim in which the components are of identical thickness, yield strength and modulus of elasticity, in which case any orientation of the components will produce joints having equal properties.

5. The assembly of claim 1 in which the materials of the components have the same modulus of elasticity but different yield strengths, with the collar of the component having the greater yield strength being the outer collar of the assembly.

6. The assembly of claim 1 in which the materials of the components have the same yield strength but different moduli of elasticity, with the collar of the component having the greatest modulus being the inner collar of the assembly.

7. The assembly of claim 1 in which the materials of components have different ratios of yield strength to modulus of elasticity, with the collar of the component having the lowest ratio being the inner collar of the assembly.

8. The assembly of claim 1 in which the components are identical in yield strength and modulus of elasticity, but different in thickness, with the collar of the thicker of the components being the inner collar of the assembly.

* * * * *